(12) United States Patent
Guo et al.

(10) Patent No.: US 12,129,874 B2
(45) Date of Patent: Oct. 29, 2024

(54) RADIAL PISTON HYDRAULIC DEVICE DISTRIBUTING FLOW BY PILOT OPERATED CHECK VALVES AND OPERATING METHOD THEREOF

(71) Applicant: HUAQIAO UNIVERSITY, Quanzhou (CN)

(72) Inventors: Tong Guo, Quanzhou (CN); Tao Luo, Quanzhou (CN); Tianliang Lin, Quanzhou (CN); Qihuai Chen, Quanzhou (CN); Haoling Ren, Quanzhou (CN); Cheng Miao, Quanzhou (CN); Shengjie Fu, Quanzhou (CN)

(73) Assignee: HUAQIAO UNIVERSITY, Quanzhou (CN)

( * ) Notice: Subject to any disclaimer, the term of this patent is extended or adjusted under 35 U.S.C. 154(b) by 96 days.

(21) Appl. No.: 18/128,226

(22) Filed: Mar. 30, 2023

(65) Prior Publication Data

US 2023/0235757 A1 Jul. 27, 2023

Related U.S. Application Data

(63) Continuation-in-part of application No. PCT/CN2022/075493, filed on Feb. 8, 2022.

(30) Foreign Application Priority Data

Apr. 22, 2021 (CN) .......................... 202110436942.4

(51) Int. Cl.
*F15B 13/02* (2006.01)
*F15B 15/14* (2006.01)
*F15B 15/18* (2006.01)

(52) U.S. Cl.
CPC ........ *F15B 13/027* (2013.01); *F15B 15/1409* (2013.01); *F15B 15/18* (2013.01)

(58) Field of Classification Search
CPC ..... F15B 13/027; F15B 15/18; F15B 15/1409
See application file for complete search history.

(56) References Cited

U.S. PATENT DOCUMENTS

| | | | | |
|---|---|---|---|---|
| 4,785,714 A | * | 11/1988 | Tamada | ............... F04B 49/02 91/499 |
| 7,959,415 B2 | * | 6/2011 | Schuetzle | ............... F04B 35/06 417/564 |
| 9,377,020 B2 | * | 6/2016 | Armstrong | ............... F03C 2/08 |

(Continued)

*Primary Examiner* — Connor J Tremarche

(57) ABSTRACT

The present disclosure relates to a radial piston hydraulic device distributing flow by pilot operated check valves and an operating method thereof. The radial piston hydraulic device includes a housing, a plurality of piston assemblies, a main shaft, first pilot operated check valves, second pilot operated check valves, and a valve plate. The first pilot operated check valves have a same number as the plurality of piston assemblies and are one-to-one corresponding to the plurality of piston assemblies. The second pilot operated check valves have a same number as the plurality of piston assemblies and are one-to-one corresponding to the plurality of piston assemblies. The radial piston hydraulic device can be used not only as the hydraulic motor, but also as a hydraulic pump, and can be used in a hydraulic system that need to realize power recovery functions.

6 Claims, 8 Drawing Sheets

(56) References Cited

U.S. PATENT DOCUMENTS

| | | | |
|---|---|---|---|
| 11,781,537 B2* | 10/2023 | Guo | F04B 1/0465 91/485 |
| 2004/0101417 A1* | 5/2004 | Arai | F04B 49/125 91/491 |
| 2014/0271244 A1* | 9/2014 | Gray, Jr. | F04B 1/0435 417/443 |
| 2023/0235757 A1* | 7/2023 | Guo | F03C 1/0438 60/327 |

* cited by examiner

RADIAL PISTON HYDRAULIC DEVICE DISTRIBUTING FLOW BY PILOT OPERATED CHECK VALVES AND OPERATING METHOD THEREOF

TECHNICAL FIELD

The present disclosure relates to a radial piston hydraulic device distributing flow by pilot operated check valves and an operating method thereof.

BACKGROUND

A radial piston hydraulic pump is a hydraulic power device, which is configured to provide oil with a certain pressure for a hydraulic system. A radial piston hydraulic motor is a common hydraulic actuating component, which is configured to drive working mechanisms to rotate at a certain speed. Output power of the radial piston hydraulic pump or the radial piston hydraulic motor depends on working pressure and a flow rate thereof, and the higher the working pressure, the higher the output power, so the radial piston hydraulic pump or the radial piston hydraulic motor is able to drive a larger load.

Distribution methods adopted by conventional radial piston hydraulic devices mainly comprise a shaft distribution method, an end face distribution method, and a check valve distribution method. A radial piston hydraulic device adopting the shaft distribution method or the end dace distribution method can be configured as the radial piston hydraulic pump and the radial piston hydraulic motor. That is, when torque is input from a transmission shaft, the radial piston hydraulic device works as the radial piston hydraulic pump and pumps out high pressure fluid. When the high pressure fluid is input to the radial piston hydraulic device, the radial piston hydraulic device works as the radial piston hydraulic motor, and the torque is output from the transmission shaft. However, due to gaps in above two distribution structures, and with the wear of moving pairs, the gaps gradually increases, which limits an improvement of working pressure. The radial piston hydraulic device adopting the check valve distribution method has good sealing performance and the radial piston hydraulic device can be configured as the radial piston hydraulic pump to pump out high pressure and ultra-high pressure fluid. However, an ordinary check valve only allows one-way flow and unable to be applied to the radial piston hydraulic motor. Therefore, the radial piston hydraulic device adopting the check valve distribution method only can be configured as the radial piston hydraulic pump.

SUMMARY

The present disclosure provides a radial piston hydraulic device distributing flow by pilot operated check valves that overcomes defects mentioned in the prior art.

In one aspect, the present disclosure provides the radial piston hydraulic device distributing the flow by the pilot operated check valves.

The radial piston hydraulic device comprises a housing, a plurality of piston assemblies, a main shaft, first pilot operated check valves, second pilot operated check valves, and a valve plate. The first pilot operated check valves have a same number as the plurality of piston assemblies and are one-to-one corresponding to the plurality of piston assemblies. The second pilot operated check valves have a same number as the plurality of piston assemblies and are one-to-one corresponding to the plurality of piston assemblies.

The housing defines a plurality of piston chambers and a distribution chamber. The distribution chamber defines a high pressure main port and a low pressure main port.

Each of the piston assemblies is slidable up and down in a corresponding piston chamber of the plurality of piston chambers.

The main shaft is rotatably connected with the housing and is connected with the plurality of piston assemblies in a transmission way.

The valve plate is rotatably mounted in the distribution chamber. The valve plate is fixedly connected with the main shaft. The valve plate defines high pressure distribution grooves communicated with the high pressure main port and low pressure distribution grooves communicated with the low pressure main port.

Each of the first pilot operated check valves comprises a first check valve body and a first check valve core. Each first check valve body comprises a first movable chamber, a first valve body oil control chamber, a first valve body high pressure chamber, and a first valve body low pressure chamber. Each first check valve core is movably mounted in a corresponding first check valve body and is configured to control opening and closing between a corresponding first valve body high pressure chamber and a corresponding first valve body low pressure chamber. Each first valve body low pressure chamber is communicated with a corresponding piston chamber of the plurality of piston chambers. Each first valve body high pressure chamber is communicated with the high pressure main port. Each first valve body oil control chamber is alternately communicated with the high pressure distribution grooves and the low pressure distribution grooves.

Each of the second pilot operated check valves comprises a second check valve body and a second check valve core. Each second check valve body comprises a second movable chamber, a second valve body oil control chamber, a second valve body high pressure chamber, and a second valve body low pressure chamber. Each second check valve core is movably mounted in a corresponding second check valve body and is configured to control opening and closing between a corresponding second valve body high pressure chamber and a corresponding second valve body low pressure chamber. Each second valve body high pressure chamber is communicated with a corresponding piston chamber of the plurality of piston chambers. Each second valve body low pressure chamber is communicated with the low pressure main port. Each second valve body oil control chamber is alternately communicated with the high pressure distribution grooves and the low pressure distribution grooves.

In one optional embodiment, two high pressure distribution grooves are provided. The high pressure distribution grooves are arc-shaped. The two high pressure distribution grooves are respectively a first high pressure distribution groove and a second high pressure high distribution groove. Two low pressure distribution grooves are provided. The low pressure distribution grooves are arc-shaped. The two low pressure distribution grooves are respectively a first low pressure distribution groove and a second low pressure flow distribution groove.

The first high pressure distribution groove and the first low pressure distribution groove are defined on a first circumference and are symmetrically arranged, and the second high pressure distribution groove and the second low pressure distribution groove are defined on a second circumference and are symmetrically arranged. A bottom wall of the distribution chamber defines first control ports. Each of the first control ports is communicated with a corresponding first valve body oil control chamber. The first control ports are corresponding to the first circumference where the first high pressure distribution groove is located. The bottom wall of the distribution chamber defines second control ports. Each of the second control ports is communicated with a corresponding second valve body oil control chamber. The second control ports are corresponding to the second circumference where the second high pressure distribution groove is located.

In one optional embodiment, a front surface of the valve plate defines a plurality of high pressure flow dividing holes communicated with the high pressure main port. A side surface of the valve plate defines a plurality of low pressure flow dividing holes communicated with the low pressure main port. The two high pressure distribution grooves and the two low pressure flow distribution grooves are defined on a rear surface of the valve plate. The two high pressure distribution grooves are communicated with the plurality of high pressure flow distribution holes, and the two low pressure flow distribution grooves are communicated with the plurality of low pressure flow distribution holes.

In one optional embodiment, each first check valve core comprises a first valve core column, a first valve core block fixed on a first end of the first valve core column, and a second valve core block fixed on a second end of the first valve core column. Each first valve core column is movably sleeved in a corresponding first movable chamber and drives a corresponding first valve core block and a corresponding second valve core block to move synchronously.

Each first valve core block is arranged in a corresponding first valve body oil control chamber and each first valve core block divides the corresponding first valve body oil control chamber into two first valve body oil control sub-chambers. Each second valve core block is arranged in a corresponding first valve body high pressure chamber and is movable between an open position and a close position of the corresponding first valve body high pressure chamber. Each first check valve core further comprises a first valve core elastic piece. Each first valve core elastic piece is sandwiched between a corresponding first valve core block and a chamber wall of a corresponding first valve body oil control chamber.

Each second check valve core comprises a second valve core column, a third valve core block fixed on a first end of the second valve core column, and a fourth valve core block fixed on a second end of the second valve core column. Each second valve core column is movably sleeved in a corresponding second movable chamber and drives a corresponding third valve core block and a corresponding fourth valve core block to move synchronously.

Each third valve core block is arranged in a corresponding second valve body oil control chamber and each third valve core block divides the corresponding second valve body oil control chamber into two second valve body oil control sub-chambers. Each fourth valve core block is arranged in a corresponding second valve body high pressure chamber and is movable between an open position and a close position of the corresponding second valve body high pressure chamber. Each second check valve core further comprises a second valve core elastic piece. Each second valve core elastic piece is sandwiched between a corresponding third valve core block and a chamber wall of a corresponding second valve body oil control chamber.

In one optional embodiment, each first valve core block defines a first pressed surface facing a first one of corresponding first valve body oil control sub-chambers. Each second valve core block defines a second pressed surface. An area of the first pressed surface of each first valve core block is greater than an area of the second pressed surface of each second valve core block. Each third valve core block defines a third pressed surface facing a first one of corresponding second valve body oil control sub-chambers. Each fourth valve core block defines a fourth pressed surface. An area of the third pressed surface of each third valve core block is greater than an area of the fourth pressed surface of each fourth valve core block. Each first check valve body defines a first pressure relief hole. The first pressure relief hole of each first check valve body is communicated with a second one of the corresponding first valve body oil control sub-chambers and a corresponding first valve body low pressure chamber.

Each second check valve body defines a second pressure relief hole. The second pressure relief hole of each second check valve body is communicated with a second one of the corresponding second valve body oil control sub-chambers and a corresponding second valve body low pressure chamber.

Compared with the prior art, the radial piston hydraulic device distributing flow by the pilot operated check valves of the present disclosure has following characteristics.

The radial piston hydraulic device distributes the flow by the pilot operated check valves, which provides a good distribution method. Thus, the radial piston hydraulic device is configured as a hydraulic motors operating at a high pressure and realizes high volumetric efficiency due to excellent sealing properties of the pilot operated check valves. The radial piston hydraulic device can be used not only as the hydraulic motor, but also as a hydraulic pump, and the radial piston hydraulic device can be used in a hydraulic system that need to realize power recovery functions.

The radial piston hydraulic device has a compact structure, is simple in transmission, and has a good sealing performance.

BRIEF DESCRIPTION OF DRAWINGS

The present disclosure will be further described below with reference to the accompanying drawings and embodiments.

DETAILED DESCRIPTION

Figure 1:
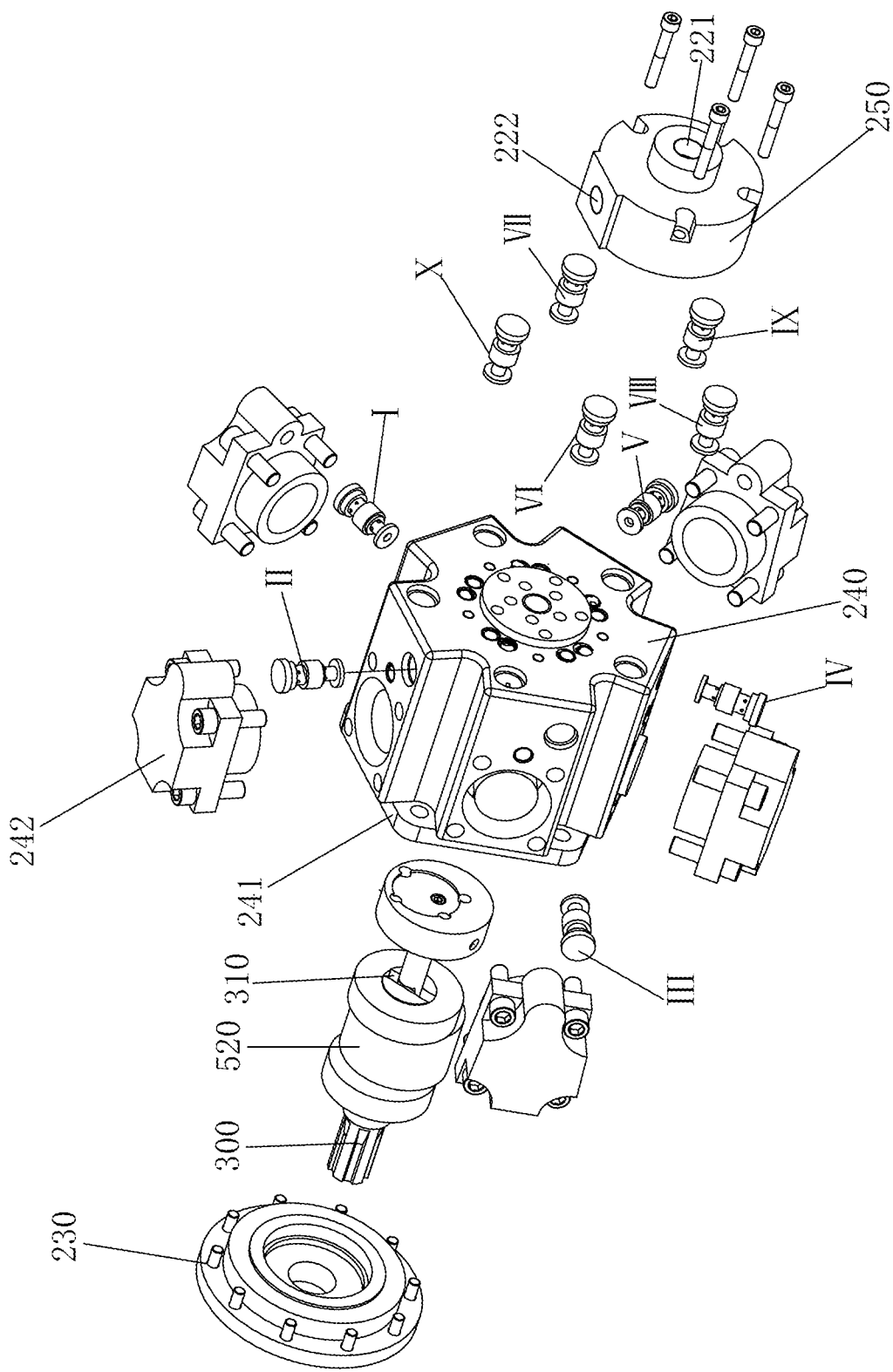
FIG. 1 is an exploded perspective schematic diagram of a radial piston hydraulic device according to one embodiment of the present disclosure.

In the claims, specification and the above-mentioned drawings of the present disclosure, unless otherwise expressly defined, for orientation terms such as "first", "second", "third", etc., are used to distinguish different objects, instead of describing a specific order.

It should be understood that in the claims, specification and the above-mentioned drawings of the present disclosure, unless otherwise expressly defined, for orientation terms such as "central", "lateral", "lengthways", "length", "width", "thickness", "upper", "lower", "left", "right", "vertical", "horizontal", "top", "bottom", "inner", "outer", "forward", "reversely", etc., indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

In the claims, specification and the above-mentioned drawings of the present disclosure, unless otherwise expressly defined, the terms "fixed connection" and "fixed connected" should be understood in a broad sense. That is, fixed connection refers to any connection method that has no displacement relationship and relative rotation relationship between two components, which includes non-removable fixed connection, detachable fixed connection, integrated and fixed connection by other means or elements.

In the claims, specification and the above-mentioned drawings of the present disclosure, terms "comprise", "include", and variations thereof mean "including but not limited to".

As shown in FIGS. 1-10, in one optional embodiment, the present disclosure provides a radial piston hydraulic device distributing flow by pilot operated check valves. The radial piston hydraulic device distributing flow by pilot operated check valves comprises a housing 200, a plurality of piston assemblies, a main shaft 300, first pilot operated check valves, second pilot operated check valves, and a valve plate 400. The first pilot operated check valves have a same number as the plurality of piston assemblies and are one-to-one corresponding to the plurality of piston assemblies. The second pilot operated check valves have a same number as the plurality of piston assemblies and are one-to-one corresponding to the plurality of piston assemblies.

The housing 200 defines a plurality of piston chambers 210 and a distribution chamber 220. The distribution chamber 220 defines a high pressure main port 221 and a low pressure main port 221.

In the embodiment, as shown in FIG. 1, the housing 200 comprises a shaft end cover 230, a housing body 240, and a distribution end cover 250. The shaft end cover 230, the housing body 240, and the distribution end cover 250 are connected in sequence and are coaxially arranged. The housing body 240 defines the plurality of piston chambers 210. The flow distribution end cover 250 and a rear end surface of the housing body 240 encloses the distribution chamber 220. The high pressure main port 221 is defined on a side end surface of the distribution end cover 250, and the low pressure main port 222 is defined on an outer peripheral surface of the distribution end cover 250. Moreover, the housing body 240 comprises a housing body base 241 and piston glands 242. Each of the piston chambers 210 is enclosed by each of piston glands 242 and a corresponding side surface of the housing body base 241. Specifically, five piston glands are provided and five piston chambers 210 are provided. Each of the piston chambers 210 is correspondingly to a corresponding first pilot operated check valve and a corresponding second pilot operated check valve. The number of the plurality of piston chambers 210 is not limited therein, and eight, ten, etc, piston chambers 210 may be provided.

Each of the piston assemblies is slidable up and down in a corresponding piston chamber 210 of the plurality of piston chambers 210.

In the embodiment, each of the piston assemblies comprises a piston 500, a connecting rod slipper 510. A top end of each connecting rod slipper 510 is sleeved in a corresponding piston 500. The radial piston hydraulic device further comprises an eccentric wheel 520 and piston return rings 530. The eccentric wheel 520 is sleeved on the main shaft 300. A bottom end of each connecting rod slipper 510 abuts against the eccentric wheel 520. Each of the piston return rings 530 is sleeved on a bottom end of a corresponding connecting rod slipper 510, and each piston 500 slides up and down in a corresponding piston chamber 210 to drive the eccentric wheel 520 and the main shaft 300 to rotate through a corresponding connecting rod slipper 510 and a corresponding piston return ring 530, so the radial piston hydraulic device is worked as a hydraulic motor. Alternatively, the main shaft 300 rotates to drive each piston 500 to slide up and down in the corresponding piston chamber 210 through each connecting rod slipper 510 and each piston return rings 530, so the radial piston hydraulic device is worked as a hydraulic pump.

Figure 2:
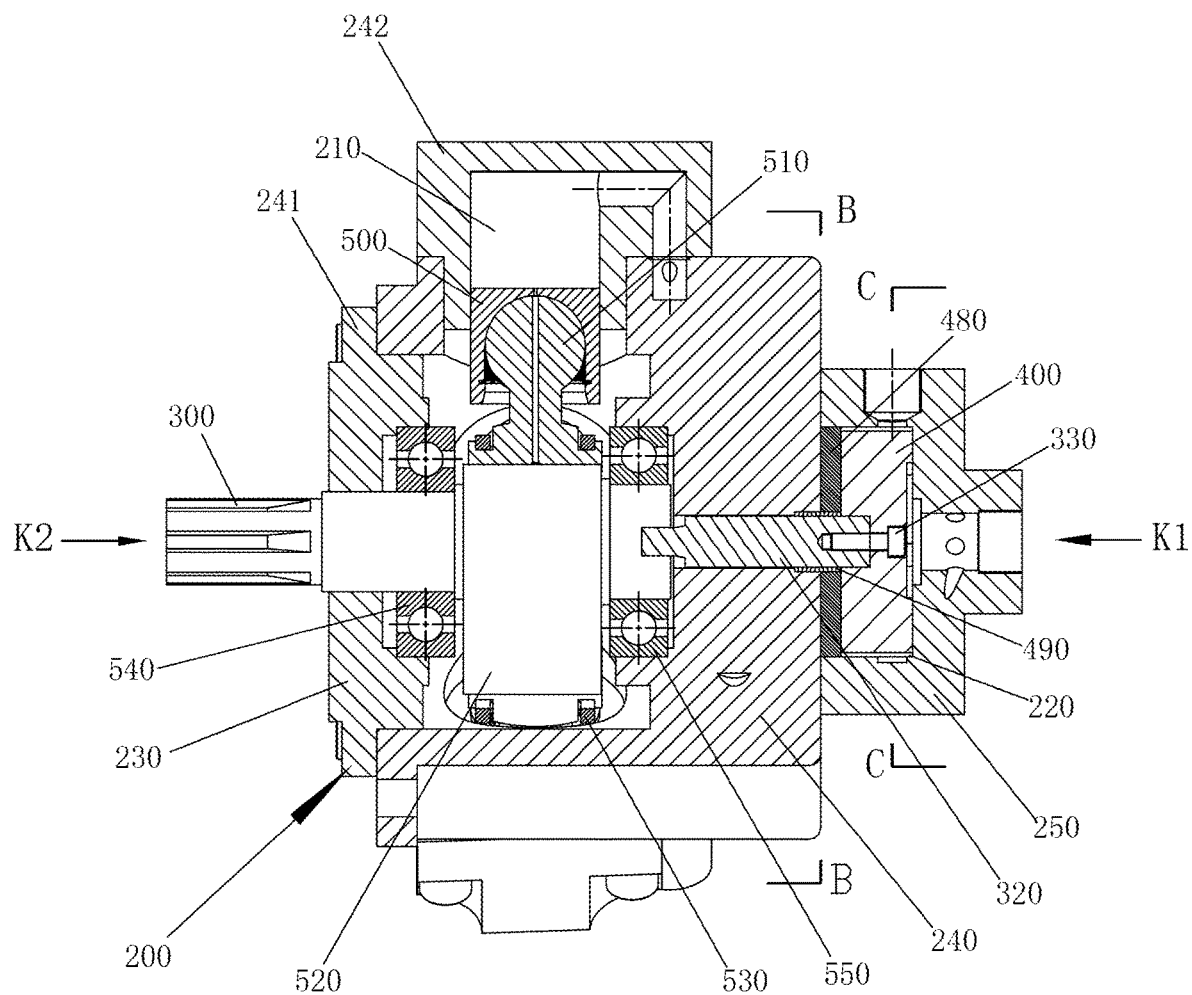
FIG. 2 is a cross-sectional schematic diagram of the radial piston hydraulic device according to one embodiment of the present disclosure.

The main shaft 300 is rotatably connected with the housing 200 and is connected with the plurality of piston assemblies in a transmission way. As shown in FIG. 2, a first bearing 540 is arranged on a left side of the eccentric wheel 520 and a second bearing 550 is arranged on a right side of the eccentric wheel 520, which stably supports the main shaft 300. Moreover, as shown in FIG. 1, a tail end of the main shaft 300 defines a first transmission key hole 310.

The valve plate 400 is rotatably mounted in the distribution chamber 220. The valve plate 400 is connected with the main shaft 300 in a transmission way. The valve plate 400 defines high pressure distribution grooves communicated with the high pressure main port 221 and low pressure distribution grooves communicated with the low pressure main port 222.

In the embodiment, as shown in FIG. 2, the radial piston hydraulic device further comprises a transmission shaft 320. A second transmission key hole 410 is defined on a rear surface of the valve plate 400. Two ends of the transmission shaft 320 are respectively inserted into and connected with the first transmission key hole 310 and the second transmission key hole 410. The radial piston hydraulic device further comprises a locking screw 330. The locking screw 330 passes through the valve plate 400 and is screwed with the transmission shaft 320. Thus, the valve plate 400 and the main shaft 300 rotate synchronously.

Figure 7:
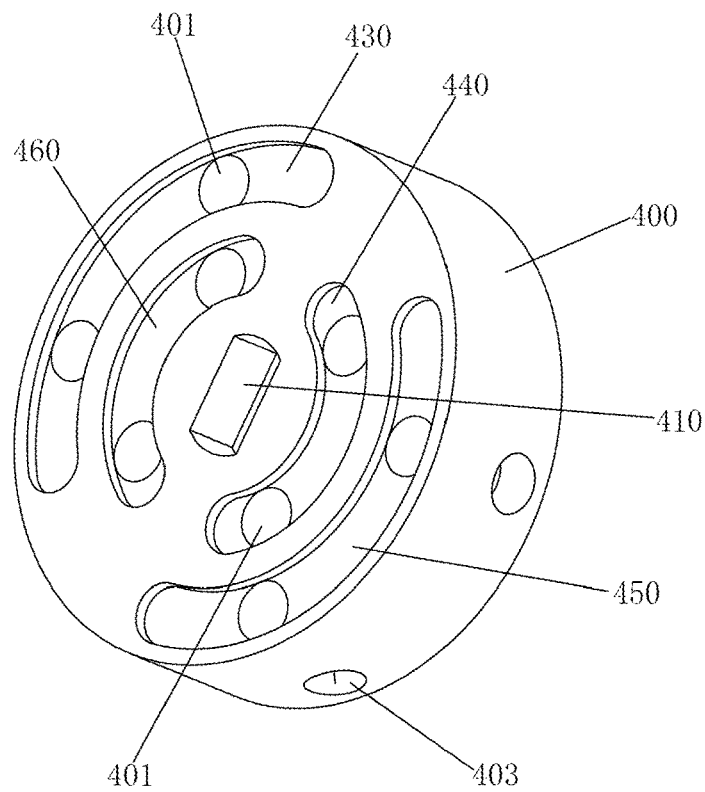
FIG. 7 is a perspective schematic diagram of a valve plate according to one embodiment of the present disclosure.

In the embodiment, as shown in FIG. 7, two high pressure distribution grooves are provided. The high pressure distribution grooves are arc-shaped and are defined on the rear surface of the valve plate. The two high pressure distribution grooves are respectively a first high pressure distribution groove 430 and a second high pressure high distribution groove 440. Two low pressure distribution grooves are provided. The low pressure distribution grooves are arc-shaped and are defined on the rear surface of the valve plate 400. The two low pressure distribution grooves are respectively a first low pressure distribution groove 450 and a second low pressure flow distribution groove 460. The first high pressure distribution groove 430 and the first low pressure distribution groove 450 are defined on a first circumference and are symmetrically arranged, and the second high pressure distribution groove 440 and the second low pressure distribution groove 460 are defined on a second circumference and are symmetrically arranged. The first circumference is greater than the second circumference.

Figure 8:
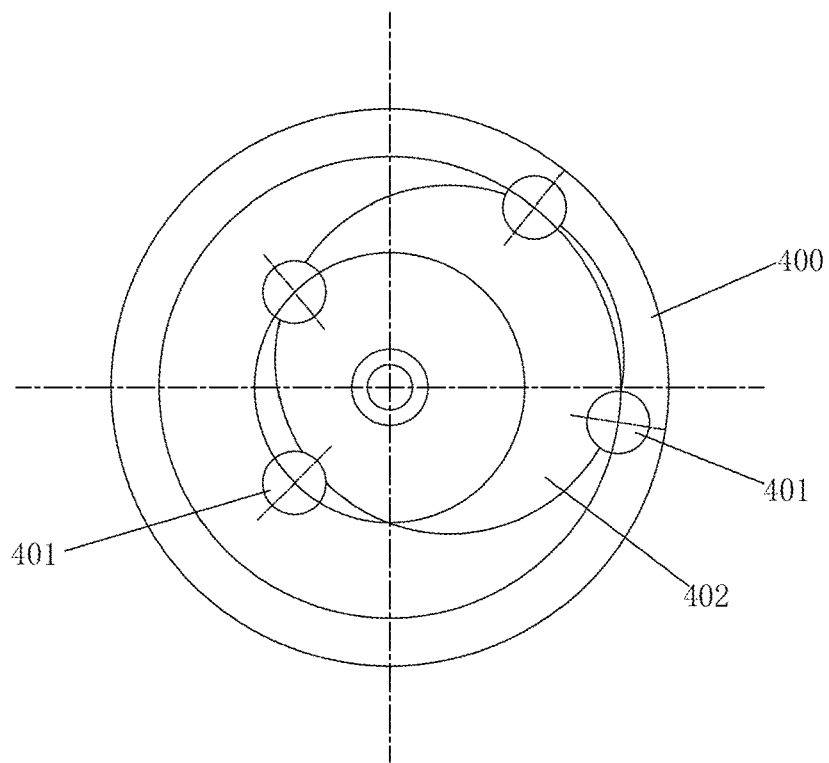
FIG. 8 is a front side schematic diagram of the valve plate according to one embodiment of the present disclosure.

In the embodiment, as shown in FIG. 8, a front surface of the valve plate defines four high pressure flow dividing holes 401 communicated with the high pressure main port 221. Two of the four high pressure flow dividing holes 401 are located on the second circumference and are communicated with the second high pressure distribution groove 440. The other two of the four high pressure flow dividing holes 401 are located on the first circumference and are communicated with the first high pressure distribution groove 430. Moreover, a high pressure guiding groove 402 is defined on the front surface of the valve plate 400. The high pressure guiding groove 402 is communicated with the four high pressure flow dividing holes 401 and is communicated with the high pressure main port 221. Therefore, when a high pressure oil tank 11 serves as an oil inlet tank, oil with high pressure in the high pressure oil tank 11 flows through the high pressure main port 221 and enters the high pressure guiding groove 402, and then enters the first high pressure distribution groove 430 and the second high pressure distribution groove 440 through the high pressure flow dividing holes 401.

Figure 4:
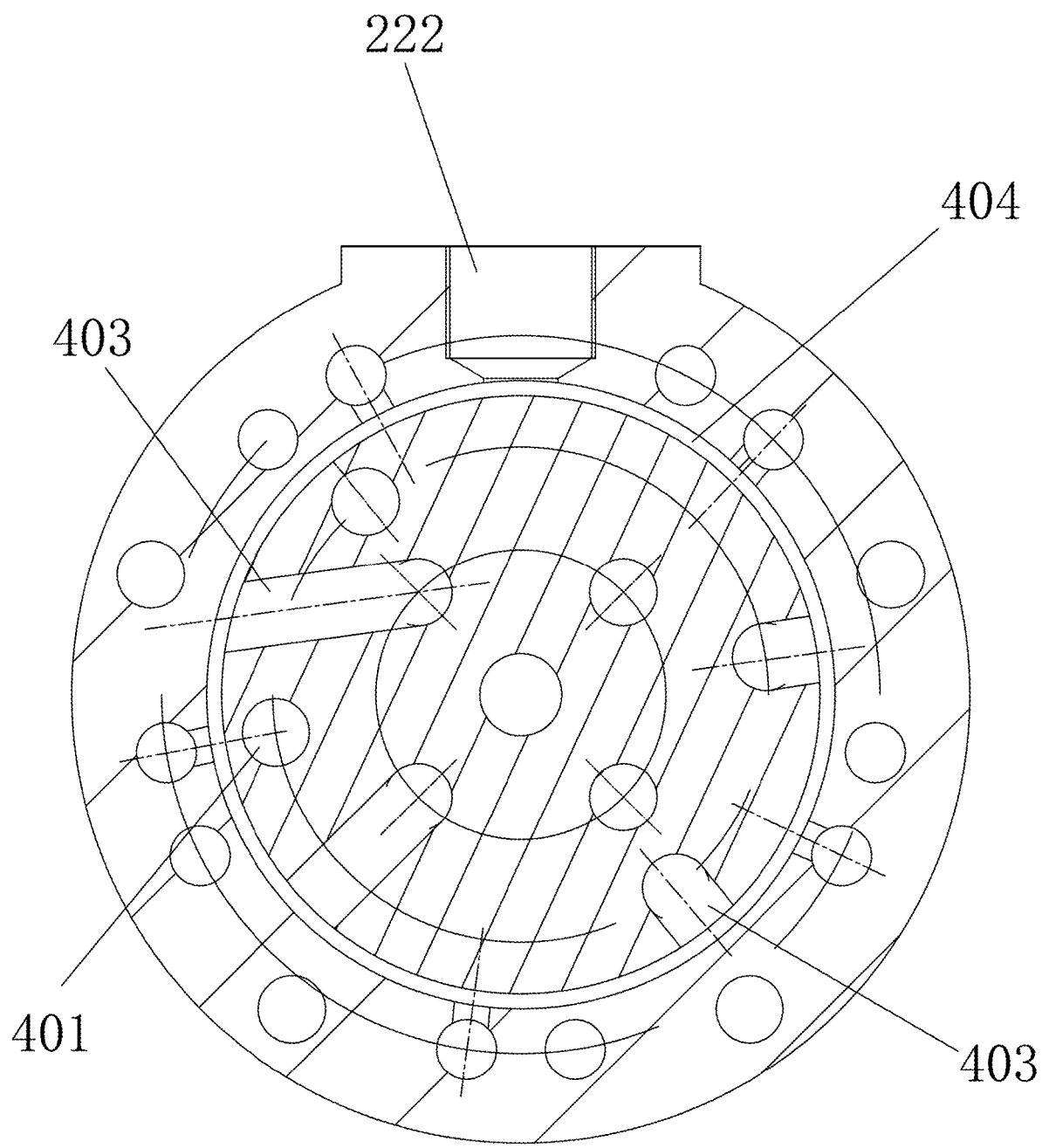
FIG. 4 is a cross-sectional schematic diagram taken along the line B-B shown in FIG. 2.

A side surface of the valve plate 400 defines four low pressure flow dividing holes 403 communicated with the low pressure main port 222. Two of the four low pressure flow dividing holes 403 are communicated with the first low pressure distribution groove 450. The other two of the four low pressure flow dividing holes 403 are communicated with the second low pressure distribution groove 460. Moreover, as shown in FIG. 4, there is a gap 404 between the valve plate 400 and the distribution chamber 220. The low pressure main port 221 and the four low pressure flow dividing holes 403 are communicated with the gap 404. Therefore, when a low pressure oil tank 12 serves as an oil outlet tank, oil with low pressure in the first low pressure distribution groove 450 and the second low pressure distribution groove 460 flows through the low pressure flow dividing holes 403 and enters the gap 404 between the valve plate 400 and the distribution chamber 220, and flows from the gap 404 to the low pressure main port 222, then enters the low pressure oil tank 12.

In the embodiment, as shown in FIG. 2, the radial piston hydraulic device further comprises a wear plate 480. The wear plate 480 is sandwiched between the valve plate 400 and a bottom wall of the distribution chamber 220. The transmission shaft 320 passes through the wear plate 480 and is inserted into and connected with the second transmission key hole 410. Optionally, a support sleeve 490 is sleeved on an outer periphery of the transmission shaft 320, and an outer periphery of the support sleeve 490 is arranged at a joint of the housing body 240 and the wear plate 480.

Five first pilot operated check valves I, II, III, IV, and V are provided. The first pilot operated check valves I, II, III, IV, and V are horizontally arranged in the housing body 240.

Figure 5:
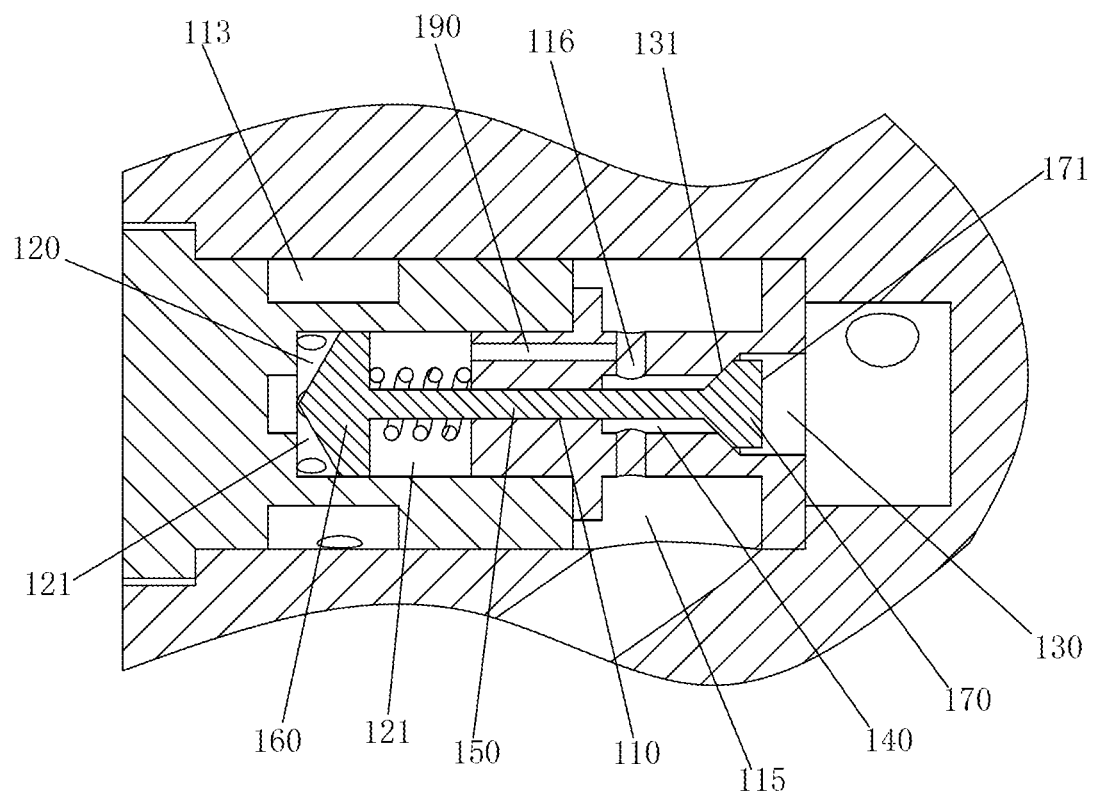
FIG. 5 is a cross-sectional schematic diagram of a first pilot operated check valve according to one embodiment of the present disclosure.
Figure 6:
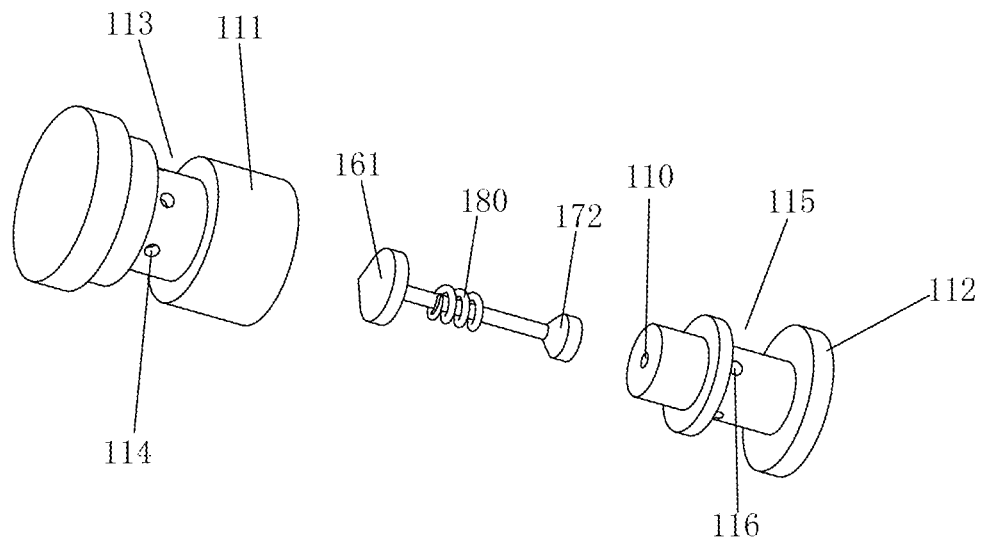
FIG. 6 is an exploded perspective schematic diagram of the first pilot operated check valve according to one embodiment of the present disclosure.

As shown in FIGS. 5 and 6, each of the first pilot operated check valves I, II, III, IV, and V comprises a first check valve body and a first check valve core. Each first check valve body comprises a first movable chamber 110, a first valve body oil control chamber 120, a first valve body high pressure chamber 130, and a first valve body low pressure chamber 140. Each first check valve core is movably mounted in a corresponding first check valve body and is configured to control opening and closing between a corresponding first valve body high pressure chamber 130 and a corresponding first valve body low pressure chamber 140. Each first valve body low pressure chamber 140 is communicated with a corresponding piston chamber 210 of the plurality of piston chambers 210. Each first valve body high pressure chamber 130 is communicated with the high pressure main port 221. Each first valve body oil control chamber 120 is alternately communicated with the high pressure distribution grooves and the low pressure distribution grooves.

Figure 3:
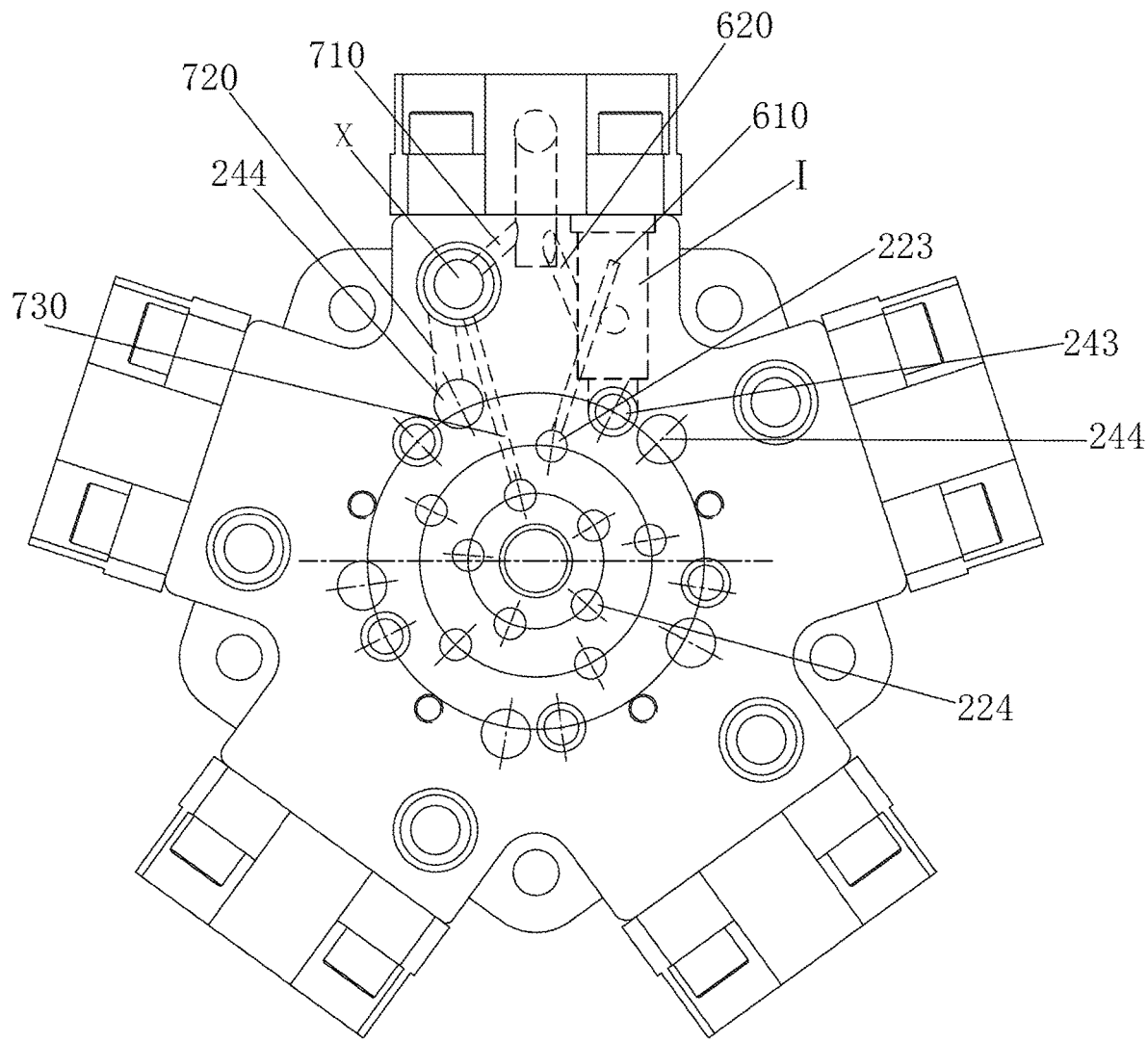
FIG. 3 is a cross-sectional schematic diagram taken along the line A-A shown in FIG. 2.

Specifically, a central axis of the housing 200 is K1-K2. A first end of the housing close to K1 is a rear end of the housing 200, and a second end of the housing close to K2 is a front end of the housing 200. As shown in FIG. 3, five high pressure port 243 annularly arranged and five low pressure ports 244 annularly arranged on a same circumference of the high pressure port 243 are defined on an end face of the housing body 240. The five high pressure port 243 are directly communicated with the high pressure main port 221, and the five low pressure ports 244 are communicated with the gap 404 between the valve plate 400 and the distribution chamber 220. The end face of the housing body close to K1 defines five first control ports 223 annularly arranged and five second control ports 224 annularly arranged. The five second control ports 224 are arranged outside of the first control ports 223. The first control ports 223 are corresponding to the first circumference where the first high pressure distribution groove 430 and the first low pressure distribution groove 450 are located. The second control ports 224 are corresponding to the second circumference where the second high pressure distribution groove and the second low pressure distribution groove are located. Meanwhile, each first valve body oil control chamber 120 is connected with a corresponding first control port 223 through a first oil control tube 610. Each first valve body high pressure chamber 130 is communicated with a corresponding high pressure port 243. Each first valve body low pressure chamber 140 is communicated with a corresponding piston chamber 210 through a first low pressure tube 620.

As shown in FIGS. 5 and 6, each first check valve body comprises a first valve body 111 and a second valve body 112. Each first valve body 111 and a corresponding second valve body 112 enclose the first valve body oil control chamber 120. Each first movable chamber 110 is defined on a center of a left surface of each second valve body 112. Each first valve body high pressure chamber 130 is defined on a center of a right surface of each second valve body 112. Each first valve body low pressure chamber 140 horizontally runs through a corresponding second valve body 112. Each first movable chamber 110, a corresponding first valve body high pressure chamber 130, and a corresponding first valve body low pressure chamber 140 are communicated with each other. An inner wall of each first valve body high pressure chamber 130 defines a first guiding ramp 131.

An outer periphery of each first valve body 111 defines a first annular groove 113. First through holes 114 are defined on a bottom wall of each first annular groove 113. The first through holes of each first annular groove 113 are communicated with a corresponding first valve body oil control chamber 120. An outer periphery of each second valve body 112 defines a second annular grooves 115. Second through holes 116 are corresponding to a bottom wall of each second annular groove 115. The second through holes 116 of each second annular groove 115 are communicated with a corresponding first valve body low pressure chamber 140.

Each first check valve core comprises a first valve core column 150, a first valve core block 160 fixed on a first end of the first valve core column 150, and a second valve core block 170 fixed on a second end of the first valve core column 150. Each first valve core column 150 is movably sleeved in a corresponding first movable chamber 110 and drives a corresponding first valve core block 160 and a corresponding second valve core block 170 to move synchronously. Each first valve core block 160 is arranged in a corresponding first valve body oil control chamber 120 and each first valve core block 160 divides the corresponding first valve body oil control chamber 120 into two first valve body oil control sub-chambers 121. Each second valve core block 170 is arranged in a corresponding first valve body high pressure chamber 130 and is movable between an open position and a close position of the corresponding first valve body high pressure chamber 130. Each first check valve core further comprises a first valve core elastic piece 180. Each first valve core elastic piece 180 is sandwiched between a corresponding first valve core block 160 and a chamber wall of a corresponding first valve body oil control chamber 120.

Each first valve core block 160 defines a first pressed surface 161 facing a first one of corresponding first valve body oil control sub-chambers 121. Each first pressed surface is conical. Each second valve core block 170 defines a second pressed surface 171 that is flat. An area of the first pressed surface 161 of each first valve core block 160 is greater than an area of the second pressed surface 171 of each second valve core block 170. Each first check valve body defines a first pressure relief hole 190. The first pressure relief hole 190 of each first check valve body is communicated with a second one of the corresponding first valve body oil control sub-chambers 121 and a corresponding first valve body low pressure chamber 140.

Each first pressure relief hole 190 avoids a situation that a corresponding first check valve core cannot move due to a dead space of a corresponding first valve body oil control sub-chamber 121 arranged on the right side thereof. Moreover, each second valve core block 170 defines a second guiding ramp 172 matching with a corresponding first guiding ramp 31. When each second guiding ramp 172 abuts against the corresponding first guiding ramp 131, a corresponding valve body high pressure chamber 130 is in a closed state. On the contrary, when each second guiding ramp 172 is separated from the corresponding first guiding ramp 131, the corresponding valve body high pressure chamber 130 is in an open state.

When the radial piston hydraulic device is operated as the hydraulic motor, each first valve body oil control chamber 120 inputs the oil with high pressure, if a pressure strength of the oil with high pressure is same as a pressure strength of the oil in each first valve body high pressure chamber, a pressure on each first valve core block 160 is greater than a pressure on each second valve core block 170, so that each first check valve core moves towards the corresponding second valve core block 170 to open the corresponding valve body high pressure chamber 130, and the corresponding valve body high pressure chamber 130 is communicated with the valve body low pressure chamber 140. If the oil with low pressure is input into each first valve body oil control chamber 120, the pressure on each first valve core block 160 is less than the pressure on each second valve core block 170, so that each first check valve core moves towards the corresponding first valve core block 160, so that the corresponding second valve core block 170 closes the corresponding valve body high pressure chamber 130, and the corresponding valve body high pressure chamber 130 is disconnected from the corresponding valve body low pressure chamber 140.

Five second pilot operated check valves VI, VII, VIII, IX, and X are provided. Structures of the second pilot operated check valves VI, VII, VIII, IX, and X are same as structures of the first pilot operated check valves I, II, III, IV, and V.

Each of the second pilot operated check valves VI, VII, VIII, IX, and X comprises a second check valve body and a second check valve core. Each second check valve body comprises a second movable chamber, a second valve body oil control chamber, a second valve body high pressure chamber, and a second valve body low pressure chamber. Each second check valve core is movably mounted in a corresponding second check valve body and is configured to control opening and closing between a corresponding second valve body high pressure chamber and a corresponding second valve body low pressure chamber. Each second valve body high pressure chamber is communicated with a corresponding piston chamber 210 of the plurality of piston chambers. Each second valve body low pressure chamber is communicated with the low pressure main port 222. Each second valve body oil control chamber is alternately communicated with the high pressure distribution grooves and the low pressure distribution grooves.

Each second check valve core comprises a second valve core column, a third valve core block fixed on a first end of the second valve core column, and a fourth valve core block fixed on a second end of the second valve core column. Each second valve core column is movably sleeved in a corresponding second movable chamber and drives a corresponding third valve core block and a corresponding fourth valve core block to move synchronously. Each third valve core block is arranged in a corresponding second valve body oil control chamber and each third valve core block divides the corresponding second valve body oil control chamber into two second valve body oil control sub-chambers. Each fourth valve core block is arranged in a corresponding second valve body high pressure chamber and is movable between an open position and a close position of the corresponding second valve body high pressure chamber. Each second check valve core further comprises a second valve core elastic piece. Each second valve core elastic piece is sandwiched between a corresponding third valve core block and a chamber wall of a corresponding second valve body oil control chamber.

Each third valve core block defines a third pressed surface facing a first one of corresponding second valve body oil control sub-chambers. Each fourth valve core block defines a fourth pressed surface. An area of the third pressed surface of each third valve core block is greater than an area of the fourth pressed surface of each fourth valve core block. Each second check valve body defines a second pressure relief hole. The second pressure relief hole of each second check valve body is communicated with a second one of the corresponding second valve body oil control sub-chambers and a corresponding second valve body low pressure chamber.

Specifically, as shown in FIG. 3, each second valve body high pressure chamber is communicated with the corresponding piston chamber 210 through a second high pressure tube 710. Each second valve body low pressure chamber is communicated with a corresponding low pressure port 244 through a second low pressure tube 720. Each second valve body oil control chamber is communicated with a corresponding second control port 224 through a second oil control tube 730.

The present disclosure provides an operating method of the radial piston hydraulic device distributing the flow by pilot operated check valves. The operating method of the radial piston hydraulic device comprises operating the radial piston hydraulic device as the hydraulic motor. When the radial piston hydraulic device is operated as the hydraulic motor, the high pressure main port is connected with a pressure oil source 11 (i.e. the high pressure oil tank). The high pressure main port is an oil inlet, and the low pressure main port is an oil outlet and is connected with the low pressure oil tank 12.

The present disclosure hereby takes one of the plurality of piston assemblies as an example for illustration.

When one of the plurality of piston assemblies is in am uppermost position of the plurality of piston assemblies, a first valve body oil control chamber 120 corresponding to the one of the plurality of piston assemblies is communicated with the high pressure distribution grooves, a second valve body oil control chamber corresponding to the one of the plurality of piston assemblies is communicated with the low pressure distribution grooves. A first check valve core corresponding to the one of the plurality of piston assemblies controls a corresponding first valve body high pressure chamber 130 to communicate with a corresponding first valve body low pressure chamber 140. A second check valve core corresponding to the one of the plurality of piston assemblies controls a corresponding second valve body high pressure chamber to be disconnected from a corresponding second valve body low pressure chamber. Oil with high pressure flows through the high pressure main port 221, the corresponding first valve body high pressure chamber 130, and the corresponding first valve body low pressure chamber 140, and then enters a corresponding piston chamber 210, so a piston 500 corresponding to the one of the plurality of piston assemblies is pushed to move downwards, a volume of the corresponding piston chamber 210 increases, so the main shaft 300 is driven to rotate forwards until the one of the plurality of piston assemblies reaches a lowermost position of the plurality of piston assemblies. Since a second check valve corresponding to the one of the plurality of piston assemblies is always in the closed state during this process, the oil in the corresponding piston chamber 210 does not flow out through the second check valve corresponding to the one of the plurality of piston assemblies.

When the one of the plurality of piston assemblies is in the lowermost position of the plurality of piston assemblies, the main shaft 300 and the valve plate 400 rotate 180 degrees forwards, the first valve body oil control chamber 120 corresponding to the one of the plurality of piston assemblies is communicated with the low pressure distribution grooves, and the second valve body oil control chamber corresponding to the one of the plurality of piston assemblies is communicated with the high pressure distribution grooves. The first check valve core corresponding to the one of the plurality of piston assemblies controls the corresponding first valve body high pressure chamber 130 to be disconnected from the corresponding first valve body low pressure chamber 140. The second check valve core corresponding to the one of the plurality of piston assemblies controls the corresponding second valve body high pressure chamber to communicate with the corresponding second valve body low pressure chamber. Under thrust of other piston assemblies of the plurality of piston assemblies and under inertial force of the main shaft 300, the one of the plurality of piston assemblies moves upwards, and the volume of the corresponding piston chamber 210 decreases. Oil in the corresponding piston chamber 210 flows through the corresponding second valve body high pressure chamber and the corresponding second valve body low pressure chamber, and flows out from the low pressure main port 222 to realize a periodic movement of the one of the plurality of piston assemblies. A first check valve corresponding to the one of the plurality of piston assemblies is always in the closed state during the process and the oil in the piston chamber 210 does not flow out through the first check valve corresponding to the one of the plurality of piston assemblies.

The plurality of piston assemblies reciprocate and make the main shaft 300 to forwards rotate, so the radial piston hydraulic device converts hydraulic energy into mechanical energy.

That is, when the radial piston hydraulic device is operated as the hydraulic motor, a flow direction of the oil is: pressure oil source 11→high pressure main port 221→first valve body high pressure chamber 130→first valve body low pressure chamber 140→piston chamber 210→second valve body high pressure chamber→second valve body low pressure chamber→low pressure main port 222→low pressure oil tank 12.

Figure 9:
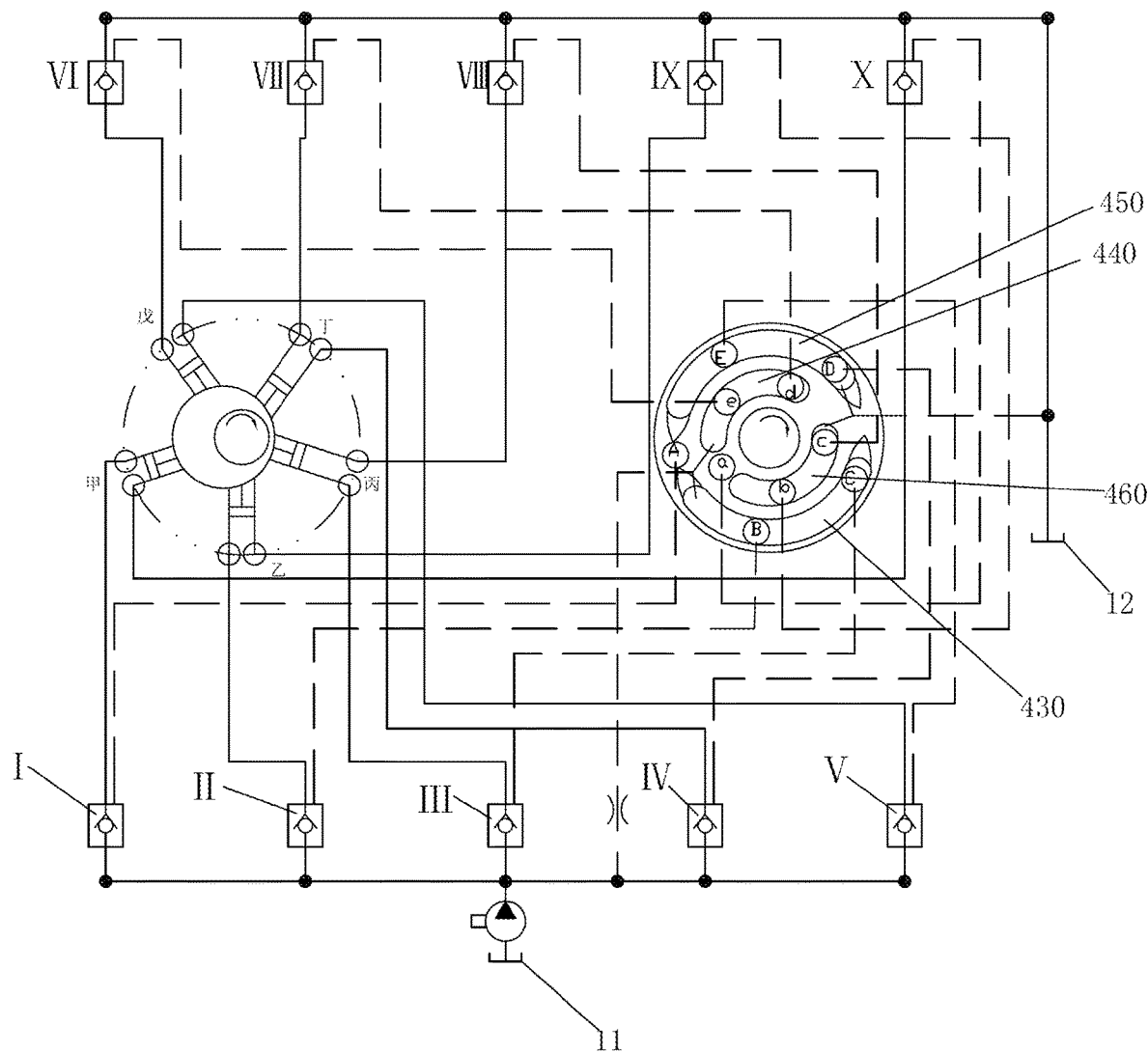
FIG. 9 is a schematic diagram showing a principle of a hydraulic motor according to one embodiment of the present disclosure.

As shown in FIG. 9, the working principle of the hydraulic motor is further described as follows.

A, B, C, D, and E represent the five first control ports 223, which control the opening and closing of the five first pilot operated check valves I, II, III, IV, and V in turn. a, b, c, d, and e represent five second control ports 224, which control the opening and closing of five second pilot operated check valves VI, VII, VIII, IX, and X in turn.

Specifically, the first control port A is communicated with the first valve body control chamber 120 of the first pilot operated check valve I. The second control port a is communicated with the first valve body control chamber 120 of the second pilot operated check valve X, and the first pilot operated check valve I and the second pilot operated check valve X correspond to the same piston chamber 210, and so on. The first control port E is communicated with the first valve body oil control chamber of the first pilot operated check valve V, and the second control port e is communicated with the first valve body oil control chamber of the second pilot operated check valve VI. The second control port e is communicated with the first valve body oi; control chamber of the second pilot operated check valve VI.

The present disclosure hereby takes the first control port B and the second control port b as an example. The first control port B is corresponding to the first high pressure distribution groove 430, and the second control port b is corresponding to the second low pressure distribution groove 460. Then the first valve body high pressure chamber of the first pilot operated check valve II is communicated with the first valve body low pressure chamber of the first pilot operated check valve II, so the first pilot operated check valve II opens, and the second valve body high pressure chamber of the second pilot operated check valve VII is disconnected from the second valve body low pressure chamber of the second pilot operated check valve VII. Thus, the second pilot operated check valve VII is closed. Therefore, the oil with high pressure in the high pressure oil tank 11 enters a corresponding high pressure port 243 through the high pressure main port 221, and then flows from the corresponding high pressure port 243 and flows into the corresponding piston chamber 210 through the first valve body high pressure chamber of the first pilot operated check valve II and the first valve body low pressure chamber of the first pilot operated check valve II, driving the corresponding piston 500 and the corresponding connecting rod slipper 510 to move downwards, and then driving the eccentric wheel 520 to rotate, and finally driving the main shaft 300 to rotate.

The present disclosure hereby takes the first control port E and the second control port e as an example. The first control port E is corresponding to the first low pressure distribution groove 450, and the second control port e is corresponding to the second high pressure distribution groove 440. The first valve body high pressure chamber of the first pilot operated check valve V is disconnected from the first valve body low pressure chamber of the first pilot operated check valve V, so the first pilot operated check valve V is closed. The second valve body high pressure chamber of the second pilot operated check valve VI is communicated with the second valve body low pressure chamber of the second pilot operated check valve VI, so the second pilot operated check valve VI opens. At this time, the corresponding piston 500 in the corresponding piston chamber 210 moves upwards to push the oil with high pressure in the piston chamber 210. The oil with high pressure passes through the second valve body high pressure chamber of the second pilot operated check valve VI, the second valve body low pressure chamber of the second pilot operated check valve VI, and enters into the low pressure ports 244, and flows through the gap 404 between the valve plate 400 and the distribution chamber 220, and finally flows out from the low pressure main port 222 into the low pressure oil tank 12. If the valve plate is then rotated 180 degrees, the first control port E is corresponding to the first high pressure distribution groove 430 and the second control port e is corresponding to the second low pressure distribution groove 460. At this time, the state of the first control port E and the second control port e can refer to the state of the first control port B and the second control port b mentioned above, and the first pilot operated check valves and the second pilot operated check valves are alternately communicated for flow distribution.

The present disclosure provides an operating method of the radial piston hydraulic device distributing flow by pilot operated check valves. The operating method of the radial piston hydraulic device comprises operating the radial piston hydraulic device as the hydraulic pump.

When the radial piston hydraulic device is the hydraulic pump, the high pressure main port 221 is connected with the high pressure oil tank 11 or a hydraulic load 13. The high pressure main port 221 is configured as the oil outlet. The low pressure main port 222 is connected with the low pressure oil tank 14, and the low pressure main port 222 is configured as the oil inlet.

The main shaft 300 reversely rotates to drive the one of the plurality of piston assemblies to move downward from the uppermost position of the plurality of piston assemblies, and the volume of the corresponding piston chamber 210 increases to form a vacuum space, and a pressure in the corresponding piston chamber 210 is lower than a pressure of the low pressure oil tank 14. Whether the second valve body oil control chamber corresponding to the one of the plurality of piston assemblies is communicated with the low pressure distribution grooves or the high pressure distribution grooves, the second check valve core corresponding to the one of the plurality of piston assemblies controls the corresponding second valve body high pressure chamber to communicate with the corresponding second valve body low pressure chamber. Whether the first valve body oil control chamber 120 corresponding to the one of the plurality of piston assemblies is communicated with the low pressure distribution grooves or the high pressure distribution grooves, the first check valve core corresponding to the one of the plurality of piston assemblies controls a corresponding first valve body high pressure chamber 130 to be disconnected from the corresponding first valve body low pressure chamber 140, so the oil in the low pressure oil tank 14 flows through the low pressure main port 222, the corresponding second valve body low pressure chamber, and the corresponding second valve body high pressure chamber, and enters the corresponding piston chamber 210 until the one of the plurality of piston assemblies moves to the lowermost position of the plurality of piston assemblies. During a process where the one of the plurality of piston assemblies is moved from the uppermost position to the lowermost position of the plurality of piston assemblies, the main shaft 300 drives the valve plate to reversely rotate 180 degrees.

When the main shaft 300 continues to reversely rotate 180 degrees, the one of the plurality of piston assemblies moves upwards, and the volume of the corresponding piston chamber 210 decreases and the pressure in the corresponding piston chamber 210 increases. The pressure in the corresponding piston chamber 210 is greater than a pressure of the high pressure oil tank or a pressure of the hydraulic load 13. At this time, whether the first valve body oil control chamber 120 corresponding to the one of the plurality of piston assemblies is communicated with the low pressure distribution grooves or the high pressure distribution grooves, the first check valve core corresponding to the one of the plurality of piston assemblies controls the corresponding first valve body high pressure chamber 130 to communicate with the corresponding first valve body low pressure chamber 140. Whether the second valve body oil control chamber corresponding to the one of the plurality of piston assemblies is communicated with the low pressure distribution grooves or the high pressure distribution grooves, the second check valve core corresponding to the one of the plurality of piston assemblies controls the corresponding second valve body high pressure chamber to be disconnected from the corresponding second valve body low pressure chamber, so the oil in the corresponding piston chamber 210 flows through the corresponding first valve body low pressure chamber 140 and the corresponding first valve body high pressure chamber 130, and enters the high pressure oil tank or the hydraulic load 13 to discharge the oil in the corresponding piston chamber 210.

The main shaft 300 reversely rotates to drive the plurality of piston assemblies to move, and the plurality of piston chamber 210s suck up the oil with low pressure and discharge the oil with high pressure, so the radial piston hydraulic device converts the mechanical energy into the hydraulic energy.

That is, when the radial piston hydraulic device is worked as the hydraulic pump, a flow direction of the oil is: low pressure oil tank 14→low pressure main port→second valve body low pressure chamber→second valve body high pressure chamber→piston chamber 210→first valve body low pressure chamber 140→first valve body high pressure chamber 130→high pressure main port 221→hydraulic load 13.

Figure 10:
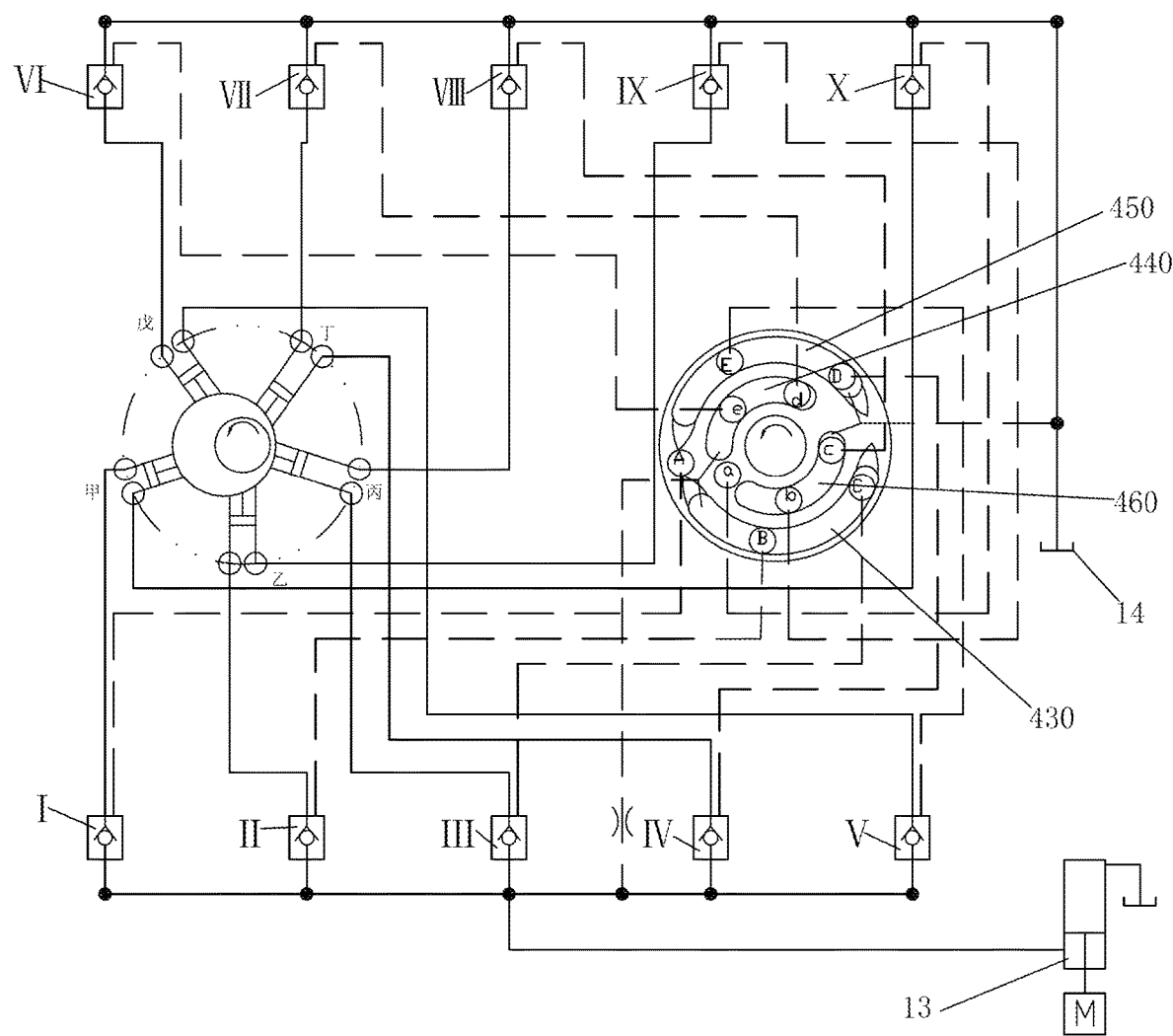
FIG. 10 is a schematic diagram showing a principle of a hydraulic pump according to one embodiment of the present disclosure.

As shown in FIG. 10, the radial piston hydraulic device operating as the hydraulic pump works in an opposite state with respect to the radial piston hydraulic device operating as the hydraulic motor. When the radial piston hydraulic device is operated as the hydraulic pump, opening or closing of the first pilot operated check valves and the second pilot operated check valves only depends on the pressure of the piston chambers 210, and does not depend on each first valve body oil control chamber and each second valve body control chamber. At this time, the first pilot operated check valves and the second pilot operated check valves play a same role as ordinary check valves.

The above descriptions are only optional embodiments of the present disclosure, so the scope of implementation of the present disclosure is not limited accordingly. That is, equivalent changes and modifications made according to the protection scope of the present disclosure and the contents of the specification should still be fall within the protection scope of the present disclosure.

The present disclosure discloses the radial piston hydraulic device distributing the flow by the pilot operated check valves and the operating method thereof. The radial piston hydraulic device comprises the housing, the plurality of piston assemblies, the main shaft, and the first pilot operated check valves, the second pilot operated check valves, and the valve plate. The first pilot operated check valves have the same number as the plurality of piston assemblies and are one-to-one corresponding to the plurality of piston assemblies. The second pilot operated check valves have the same number as the plurality of piston assemblies and are one-to-one corresponding to the plurality of piston assemblies. The radial piston hydraulic device distributes the flow by the pilot operated check valves, which provides a good distribution method of the oil. Thus, the radial piston hydraulic device is configured as the hydraulic motors operating at a high pressure and realizes high volumetric efficiency due to excellent sealing properties of the pilot operated check valves. The radial piston hydraulic device can be used not only as the hydraulic motor, but also as the hydraulic pump, and the radial piston hydraulic device can be used in a hydraulic system that need to realize power recovery functions. The radial piston hydraulic device has an industrial practicality.

What is claimed is:

1. A radial piston hydraulic device distributing flow by pilot operated check valves, comprising:
    a housing;
    a plurality of piston assemblies;
    a main shaft;
    first pilot operated check valves having a same number as the plurality of piston assemblies and one-to-one corresponding to the plurality of piston assemblies;
    second pilot operated check valves having a same number as the plurality of piston assemblies and one-to-one corresponding to the plurality of piston assemblies; and
    a valve plate;
    wherein the housing defines a plurality of piston chambers and a distribution chamber; the distribution chamber defines a high pressure main port and a low pressure main port;
    wherein each of the piston assemblies is slidable up and down in a corresponding piston chamber of the plurality of piston chambers;
    wherein the main shaft is rotatably connected with the housing and is connected with the plurality of piston assemblies in a transmission way;
    wherein the valve plate is rotatably mounted in the distribution chamber; the valve plate is fixedly connected with the main shaft; the valve plate defines high pressure distribution grooves communicated with the high pressure main port and low pressure distribution grooves communicated with the low pressure main port;
    wherein each of the first pilot operated check valves comprises a first check valve body and a first check valve core; each first check valve body comprises a first movable chamber, a first valve body oil control chamber, a first valve body high pressure chamber, and a first valve body low pressure chamber; each first check valve core is movably mounted in a corresponding first check valve body and is configured to control opening and closing between a corresponding first valve body high pressure chamber and a corresponding first valve body low pressure chamber; each first valve body low pressure chamber is communicated with a corresponding piston chamber of the plurality of piston chambers; each first valve body high pressure chamber is communicated with the high pressure main port; each first valve body oil control chamber is alternately communicated with the high pressure distribution grooves and the low pressure distribution grooves;
    wherein each of the second pilot operated check valves comprises a second check valve body and a second check valve core; each second check valve body comprises a second movable chamber, a second valve body oil control chamber, a second valve body high pressure chamber, and a second valve body low pressure chamber; each second check valve core is movably mounted in a corresponding second check valve body and is configured to control opening and closing between a corresponding second valve body high pressure chamber and a corresponding second valve body low pressure chamber; each second valve body high pressure chamber is communicated with a corresponding piston chamber of the plurality of piston chambers; each second valve body low pressure chamber is communicated with the low pressure main port; each second valve body oil control chamber is alternately communicated with the high pressure distribution grooves and the low pressure distribution grooves.

2. The radial piston hydraulic device according to claim 1, wherein two high pressure distribution grooves are provided; the high pressure distribution grooves are arc-shaped; the two high pressure distribution grooves are respectively a first high pressure distribution groove and a second high pressure high distribution groove; two low pressure distribution grooves are provided; the low pressure distribution grooves are arc-shaped; the two low pressure distribution grooves are respectively a first low pressure distribution groove and a second low pressure flow distribution groove;
    wherein the first high pressure distribution groove and the first low pressure distribution groove are defined on a first circumference and are symmetrically arranged; the second high pressure distribution groove and the second low pressure distribution groove are defined on a second circumference and are symmetrically arranged; a bottom wall of the distribution chamber defines first control ports; each of the first control ports is communicated with a corresponding first valve body oil control chamber; the first control ports are corresponding to the first circumference where the first high pressure distribution groove is located; the bottom wall of the distribution chamber defines second control ports; each of the second control ports is communicated with a corresponding second valve body oil control chamber; the second control ports are corresponding to the second circumference where the second high pressure distribution groove is located.

3. The radial piston hydraulic device according to claim 2, wherein a front surface of the valve plate defines a plurality of high pressure flow dividing holes communicated with the high pressure main port; a side surface of the valve plate defines a plurality of low pressure flow dividing holes communicated with the low pressure main port; the two high pressure distribution grooves and the two low pressure flow distribution grooves are defined on a rear surface of the valve plate; the two high pressure distribution grooves are communicated with the plurality of high pressure flow distribution holes, and the two low pressure flow distribution grooves are communicated with the plurality of low pressure flow distribution holes.

4. The radial piston hydraulic device according to claim 2, wherein each first check valve core comprises a first valve core column, a first valve core block fixed on a first end of the first valve core column, and a second valve core block fixed on a second end of the first valve core column; each first valve core column is movably sleeved in a corresponding first movable chamber and drives a corresponding first valve core block and a corresponding second valve core block to move synchronously;
wherein each first valve core block is arranged in a corresponding first valve body oil control chamber and each first valve core block divides the corresponding first valve body oil control chamber into two first valve body oil control sub-chambers; each second valve core block is arranged in a corresponding first valve body high pressure chamber and is movable between an open position and a close position of the corresponding first valve body high pressure chamber; each first check valve core further comprises a first valve core elastic piece; each first valve core elastic piece is sandwiched between a corresponding first valve core block and a chamber wall of a corresponding first valve body oil control chamber;
wherein each second check valve core comprises a second valve core column, a third valve core block fixed on a first end of the second valve core column, and a fourth valve core block fixed on a second end of the second valve core column; each second valve core column is movably sleeved in a corresponding second movable chamber and drives a corresponding third valve core block and a corresponding fourth valve core block to move synchronously;
wherein each third valve core block is arranged in a corresponding second valve body oil control chamber and each third valve core block divides the corresponding second valve body oil control chamber into two second valve body oil control sub-chambers; each fourth valve core block is arranged in a corresponding second valve body high pressure chamber and is movable between an open position and a close position of the corresponding second valve body high pressure chamber; each second check valve core further comprises a second valve core elastic piece; each second valve core elastic piece is sandwiched between a corresponding third valve core block and a chamber wall of a corresponding second valve body oil control chamber.

5. The radial piston hydraulic device according to claim 4, wherein each first valve core block defines a first pressed surface facing a first one of corresponding first valve body oil control sub-chambers; each second valve core block defines a second pressed surface; an area of the first pressed surface of each first valve core block is greater than an area of the second pressed surface of each second valve core block; each third valve core block defines a third pressed surface facing a first one of corresponding second valve body oil control sub-chambers; each fourth valve core block defines a fourth pressed surface; an area of the third pressed surface of each third valve core block is greater than an area of the fourth pressed surface of each fourth valve core block; each first check valve body defines a first pressure relief hole; the first pressure relief hole of each first check valve body is communicated with a second one of the corresponding first valve body oil control sub-chambers and a corresponding first valve body low pressure chamber; each second check valve body defines a second pressure relief hole; the second pressure relief hole of each second check valve body is communicated with a second one of the corresponding second valve body oil control sub-chambers and a corresponding second valve body low pressure chamber.

6. An operating method of a radial piston hydraulic device distributing flow by pilot operated check valves, applied to the radial piston hydraulic device according to claim 1, comprising:
operating the radial piston hydraulic device as a hydraulic motor; and
operating the radial piston hydraulic device as a hydraulic pump;
wherein when the radial piston hydraulic device is operated as the hydraulic motor;
the high pressure main port is connected with a pressure oil source; the high pressure main port is an oil inlet, and the low pressure main port is an oil outlet;
wherein when one of the plurality of piston assemblies is in am uppermost position of the plurality of piston assemblies, a first valve body oil control chamber corresponding to the one of the plurality of piston assemblies is communicated with the high pressure distribution grooves, and a second valve body oil control chamber corresponding to the one of the plurality of piston assemblies is communicated with the low pressure distribution grooves; a first check valve core corresponding to the one of the plurality of piston assemblies controls a corresponding first valve body high pressure chamber to communicate with a corresponding first valve body low pressure chamber; a second check valve core corresponding to the one of the plurality of piston assemblies controls a corresponding second valve body high pressure chamber to be disconnected from a corresponding second valve body low pressure chamber, oil with high pressure flows through the high pressure main port, the corresponding first valve body high pressure chamber, and the corresponding first valve body low pressure chamber, and then enters a corresponding piston chamber, so a piston corresponding to the one of the plurality of piston assemblies is pushed to move downwards, a volume of the corresponding piston chamber increases; the main shaft is driven to perform rotate forwards until the one of the plurality of piston assemblies reaches a lowermost position of the plurality of piston assemblies;

wherein when the one of the plurality of piston assemblies is in the lowermost position of the plurality of piston assemblies, the main shaft and the valve plate rotate 180 degrees forwards, the first valve body oil control chamber corresponding to the one of the plurality of piston assemblies is communicated with the low pressure distribution grooves, and the second valve body oil control chamber corresponding to the one of the plurality of piston assemblies is communicated with the high pressure distribution grooves; the first check valve core corresponding to the one of the plurality of piston assemblies controls the corresponding first valve body high pressure chamber to be disconnected from the corresponding first valve body low pressure chamber; the second check valve core corresponding to the one of the plurality of piston assemblies controls the corresponding second valve body high pressure chamber to communicate with the corresponding second valve body low pressure chamber; under thrust of other piston assemblies of the plurality of piston assemblies and under inertial force of the main shaft, the one of the plurality of piston assemblies moves upwards, the volume of the corresponding piston chamber decreases; oil in the corresponding piston chamber flows through the corresponding second valve body high pressure chamber and the corresponding second valve body low pressure chamber and flows out from the low pressure main port to realize a periodic movement of the one of the plurality of piston assemblies; the plurality of piston assemblies reciprocate and make the main shaft to rotate forwards, so the radial piston hydraulic device converts hydraulic energy into mechanical energy;

wherein when the radial piston hydraulic device is operated as the hydraulic pump, the high pressure main port is connected with a high pressure oil tank or a hydraulic load, and the high pressure main port is configured as the oil outlet; the low pressure main port is connected with a low pressure oil tank, and the low pressure main port is configured as the oil inlet;

wherein the main shaft reversely rotates to drive the one of the plurality of piston assemblies to move downwards from the uppermost position of the plurality of piston assemblies, and the volume of the corresponding piston chamber increases to form a vacuum space, and a pressure in the corresponding piston chamber is less than a pressure of the low pressure oil tank; whether the second valve body oil control chamber corresponding to the one of the plurality of piston assemblies is communicated with the low pressure distribution grooves or the high pressure distribution grooves, the second check valve core corresponding to the one of the plurality of piston assemblies controls the corresponding second valve body high pressure chamber to communicate with the corresponding second valve body low pressure chamber; whether the first valve body oil control chamber corresponding to the one of the plurality of piston assemblies is communicated with the low pressure distribution grooves or the high pressure distribution grooves, the first check valve core corresponding to the one of the plurality of piston assemblies controls the corresponding first valve body high pressure chamber to be disconnected from the corresponding first valve body low pressure chamber; the oil in the low pressure oil tank flows through the low pressure main port, the corresponding second valve body low pressure chamber, and the corresponding second valve body high pressure chamber, and enters the corresponding piston chamber until the one of the plurality of piston assemblies moves to the lowermost position of the plurality of piston assemblies; during a process where the one of the plurality of piston assemblies is moved from the uppermost position to the lowermost position of the plurality of piston assemblies, the main shaft drives the valve plate to reversely rotate 180 degrees;

wherein when the main shaft continues to reversely rotates 180 degrees, the one of the plurality of piston assemblies moves upwards, the volume of the corresponding piston chamber decreases and the pressure in the corresponding piston chamber increases; the pressure in the corresponding piston chamber is greater than a pressure of the high pressure oil tank or a pressure of the hydraulic load; whether the first valve body oil control chamber corresponding to the one of the plurality of piston assemblies is communicated with the low pressure distribution grooves or the high pressure distribution grooves, the first check valve core corresponding to the one of the plurality of piston assemblies controls the corresponding first valve body high pressure chamber to communicate with the corresponding first valve body low pressure chamber; whether the second valve body oil control chamber corresponding to the one of the plurality of piston assemblies is communicated with the low pressure distribution grooves or the high pressure distribution grooves, the second check valve core corresponding to the one of the plurality of piston assemblies controls the corresponding second valve body high pressure chamber to be disconnected from the corresponding second valve body low pressure chamber, and the oil in the corresponding piston chamber flows through the corresponding first valve body low pressure chamber and the corresponding first valve body high pressure chamber, and enters the high pressure oil tank or the hydraulic load to discharge the oil in the corresponding piston chamber; the main shaft reversely rotates to drive the plurality of piston assemblies to move; the plurality of piston chambers suck up the oil with low pressure and discharge the oil with high pressure, so the radial piston hydraulic device converts the mechanical energy into the hydraulic energy.

* * * * *